Nov. 30, 1937.                H. W. LORD                2,100,863
                         ELECTRIC VALVE CIRCUIT
                         Filed Oct. 31, 1936
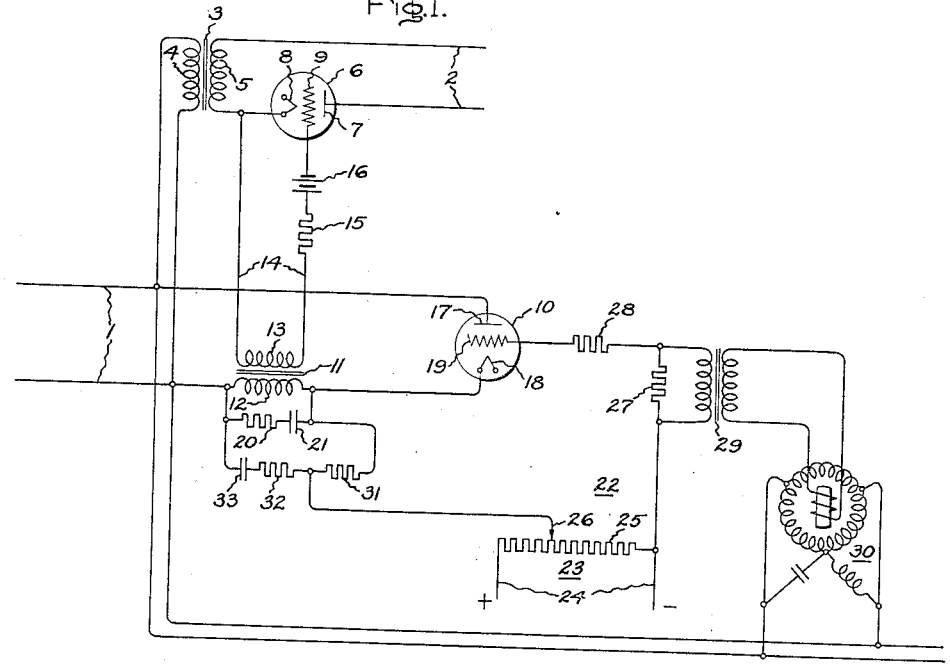
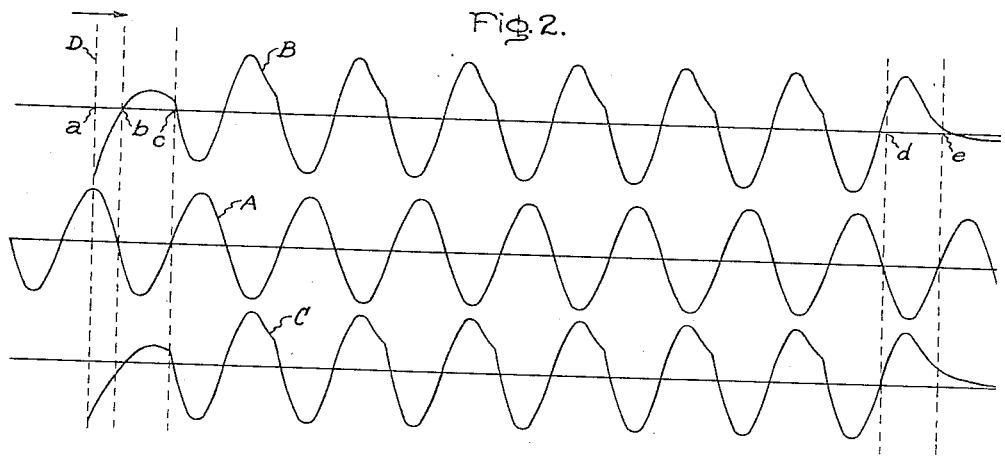
Inventor:
Harold W. Lord,
by Harry E. Dunham
His Attorney.

Patented Nov. 30, 1937

2,100,863

UNITED STATES PATENT OFFICE 2,100,863

ELECTRIC VALVE CIRCUIT

Harold W. Lord, Schenectady, N. Y., assignor to General Electric Company, a corporation of New York Application October 31, 1936, Serial No. 108,645

11 Claims. (Cl. 250—27)

My invention relates to electric valve circuits and more particularly to control or excitation circuits for electric valve means.

In electric circuits where it is desirable to provide control means for effecting rapid and frequent energization and deenergization of associated apparatus or circuits, it has been found advantageous to employ electric valve means to effect this control due to the facility with which electric valve means are capable of controlling relatively large amounts of power with control equipment of relatively small power rating. This feature is of particular importance in welding applications where it is desirable to effect a large number of successive energizations of the associated welding circuit, and where it is important to employ control equipment of small rating. Where the magnitude of the current to be controlled is great, it has become important to provide circuits which do not impose transient conditions of extreme severity on the control electric valve equipment. For example, where electric valve means such as electric discharge devices of the gaseous or vapor type are employed, it has been found important to control the circuits so that the maximum value of current conducted by the electric discharge devices is maintained below a predetermined value which is not injurious to the discharge devices. Apparatus employed in alternating current circuits which are frequently and rapidly opened and closed is subjected to relatively large currents depending on the time in the cycle of alternating voltage at which the circuit is closed. Furthermore, it has been noted that when these transient high current conditions exist there is a large direct current component in the transient current which tends to saturate inductive apparatus, such as transformers, which may be connected in the circuit. It has been recognized that there is for every circuit a definite time in the cycle of alternating voltage at which the circuit may be closed without imposing on the associated apparatus a transient high current condition. There has been evidenced a decided need for control apparatus for electric valve means which controls the conducitivity of the electric valve means so that under the above mentioned conditions the transient starting current is maintained below a predetermined safe operating value.

It is an object of my invention to provide a new and improved electric valve circuit which prevents extremely large currents from flowing in associated circuits.

It is another object of my invention to provide a new and improved control or excitation circuit for electric valve means.

In accordance with the illustrated embodiment of my invention, I provide an improved control or excitation circuit for electric valve means whereby the starting current is maintained within a predetermined safe range of values. An alternating current circuit supplies energy to a load circuit through an electric valve means. The load circuit may be designed to furnish a relatively large current to associated equipment such as welding apparatus. The electric valve means is controlled by a control circuit including a transformer and a control electric valve means. The control electric valve means, preferably of the type employing an ionizable medium, is connected in series relation with a primary winding of the transformer and the alternating current circuit and effects control of the energization of the transformer and hence controls the energization of the associated load circuit through the first mentioned electric valve means. A secondary winding of the transformer is employed to control the energization of a control member of the first mentioned electric valve means. The excitation circuit for controlling the energization of a control member of the control electric valve means comprises a voltage divider for impressing on the control member a negative unidirectional biasing potential for maintaining the electric valve means non-conductive during predetermined intervals. Connected in series relation with the voltage divider and the control member of the control electric valve means, I provide a transformer for introducing in the excitation circuit a voltage of peaked wave form adjustable in phase and having a magnitude substantially equal to the magnitude of the negative unidirectional biasing potential. The time during each initial cycle of conduction at which the electric valve means is rendered conductive may be controlled or adjusted by controlling the phase position of the voltage of peaked wave form relative to the voltage of the alternating current supply circuit. In order to impress an alternating potential on the control circuit for the first mentioned electric valve means by using only one electric valve, I connect in parallel relation with the primary winding of the transformer a seriallyconnected resistance and capacitance which cooperate with the transformer to impress on the associated control circuit a substantially sinusoidal alternating voltage. To provide a means for advancing the time during each positive half cycle, after the first positive half cycle of conduction, at which the electric valve means are rendered conductive, I provide a circuit comprising serially-connected resistances and a capacitance connected in series relation with the control electric valve means for introducing in the excitation circuit a potential of a polarity opposite to that provided by the voltage divider during positive half cycles of voltage of the alternating current circuit.

For a better understanding of my invention, reference may be had to the following description taken in connection with the accompanying drawing and its scope will be pointed out in the appended claims. Fig. 1 of the accompanying drawing diagrammatically represents an embodiment of my invention as applied to an electric valve circuit for controlling the transfer of energy between an alternating current circuit and a load circuit, and Fig. 2 represents certain operating characteristics of the embodiment of my invention shown in Fig. 1.

Fig. 1 of the accompanying drawing diagrammatically shows an embodiment of my invention as applied to an electric valve translating circuit in which electrical energy is transmitted between an alternating current supply circuit 1 and a load circuit 2 through a transformer 3 having a primary winding 4 and a secondary winding 5 and an electric valve means 6, preferably of the type employing an ionizable medium such as a gas or a vapor and having an anode 7, a cathode 8, and a control member 9. The secondary winding 5 of transformer 3 may be designed to furnish a relatively large current to the load circuit 2. A control circuit including a control electric valve means 10 and a transformer 11, having a primary winding 12 and a secondary winding 13, are provided to control the conductivity of electric valve means 6 through a circuit 14, which includes secondary winding 13, a current limiting resistance 15 and a suitable source of negative biasing potential such as a battery 16. The electric valve means 10 is connected in series relation with the primary winding 12 of transformer 11 and the alternating current circuit 1 to control the energization of the transformer 11 and the load circuit 2, and is preferably of the type employing an ionizable medium such as a gas or a vapor. The electric valve means 10 comprises an anode 17, a cathode 18, and a control member 19.

Where it is desired to impress on the circuit 14 an alternating voltage of substantially sinusoidal wave form variable in phase, I provide a circuit comprising a serially-connected resistance 20 and a capacitance 21 connected in parallel relation with the primary winding 12 of transformer 11. This circuit comprising the resistance 20 and the capacitance 21 is periodically energized from the alternating current circuit 1 through the electric valve means 10 and cooperates with the transformer 11 to impress on the circuit 14 a substantially sinusoidal alternating voltage.

In order to control the conductivity of the electric valve means 10 there is provided an excitation circuit 22 comprising any suitable source of controllable or adjustable negative unidirectional potential such as a voltage divider 23 comprising a source of direct current 24, a resistance 25, and an adjustable contact or tap 26. A predetermined component of the voltage appearing across the terminals of the resistance 25 is impressed on control member 19 of electric valve means 10 through a circuit including serially-connected resistances 27 and 28. A control voltage adjustable in magnitude and in phase position relative to the voltage of the alternating current circuit 1 and which may have a maximum value substantially equal to the magnitude of the negative unidirectional biasing potential, is introduced in the excitation circuit 22 and is superimposed on the negative unidirectional biasing potential. This control voltage may be an alternating voltage of peaked wave form to effect precise and accurate control of the electric valve means 10. As a means for introducing in the excitation circuit 22 an alternating voltage of peaked wave form, I have chosen to represent the apparatus as comprising a transformer 29 which may be energized from any suitable source of alternating voltage, such as the alternating current circuit 1, through any conventional phase shifting arrangement such as the rotary phase shifting device 30. While for the purpose of explaining my invention I have chosen to represent the source of peaked voltage as comprising a specially designed transformer, it should be understood that I may employ any other conventional arrangement known in the art.

I provide a circuit comprising serially-connected resistances 31 and 32 and capacitance 33 which is responsive to an electrical condition of the electric valve 10 or responsive to an electrical condition of circuit 1, and may be energized from the alternating current circuit 1 through the electric valve means 10 during a predetermined positive half cycle of voltage of the alternating current circuit 1 to effect an advance in the time of energization of the control member 19 of the electric valve means 10 during successive positive half cycles of voltage and to advance in phase the voltage impressed on control member 9 of electric valve means 6 through circuit 14. The circuit comprising the resistances 31 and 32 and capacitance 33 operates as a source of positive potential which is correlating in phase relative to the voltage impressed on anode 17 and is superimposed on the negative unidirectional biasing potential supplied by the voltage divider 23 and the peaked voltage of transformer 29.

The operation of the embodiment of my invention diagrammatically shown in Fig. 1 of the accompanying drawing may be best explained by considering the electric valve translating system when it is arranged to transmit energy from the alternating current circuit 1 to the load circuit 2. Let it be assumed that the rotary phase shifter 30 is adjusted so that the maximum value of the voltage of peaked wave form supplied by the transformer 29 lags the voltage of the alternating current circuit 1 by a suitable angle, as for example, 90 electrical degrees. Furthermore, let it be assumed that the voltage divider 23 is designed so that the negative unidirectional voltage introduced in the excitation circuit by this voltage divider may be increased to a value substantially greater than the maximum value of the peaked voltage supplied by transformer 29. Under these conditions, the electric valve means 10 will, of course, be maintained non-conductive since the voltage impressed on the control member 19 of electric valve means 10 is less positive than the minimum voltage required for initiation of an electrical discharge within the electric valve means 10. When these conditions prevail, electric valve means 6 will be non-conducting since circuit 14 will not be energized. By adjusting the contactor 26 of the voltage divider 23 to effect a decrease in the magnitude of the negative biasing potential, it will be understod that as the magnitude of the negative biasing potential becomes substantially equal to the magnitude of the voltage of peaked wave form, the electric valve means 10 and hence electric valve means 6 will be rendered conductive at the time during a positive half cycle of alternating voltage of circuit 1 established by the phase position of the voltage of peaked wave form. Under the above assumed conditions, the electric valve means 10 will be rendered conductive by the voltage of peaked wave form at approximately the maximum value of the first positive half cycle of voltage of the alternating current circuit 1.

Referring to Fig. 2, curve A represents the voltage of the alternating current circuit 1; curve B represents the voltage appearing across the terminals of resistance 31, and curve C represents the voltage appearing across the terminals of primary winding 12 of transformer 11. If the rotary phase shifter 30 is adjusted so that the electric valve means 10 is rendered conductive at the time corresponding to the point established by line D, the circuit including the resistances 31 and 32 and capacitance 33 will be energized from the alternating current circuit 1 through the electric valve means 10, and the voltage appearing across the terminals of resistance 31 during the remaining portion of this first positive half cycle of voltage of the alternating current circuit 1 may be represented by the portion of curve B lying between the points $a$ and $b$. During the portion of the first positive half cycle established by the points $a$ and $b$, the circuit including the serially-connected resistance 20 and capacitance 21 will be charged from the alternating current circuit 1 through the electric valve means 10. During the following half cycle, that is during the negative half cycle following the first positive half cycle of conduction, the capacitance 21 will discharge through the primary winding 12 of transformer 11 so that there is impressed on the circuit 14 a negative voltage. Due to the periodic charging and discharging phenomenon of capacitance 21 and due to the inductance of the transformer 11, the voltage impressed on circuit 14 during subsequent cycles will be substantially sinusoidal.

The circuit comprising the serially-connected resistances 31 and 32 and capacitance 33 will impress on the control member 19 of electric valve means 10 a positive voltage during the interval represented by points $b$ and $c$. This interval corresponds to the negative half cycle of alternating voltage of circuit 1 and during this interval the capacitance 33 discharges through a circuit comprising the serially-connected resistances 32 and 31 and the primary winding 12 of transformer 11, so that there is impressed on the control member 19 of electric valve means 10 through resistances 25, 27, and 28, a positive potential which is in opposition to the biasing potential supplied by the voltage divider 23 to effect an advance in the time of energization of the control member 19 of electric valve means 10 during subsequent positive half cycles. After the first negative half cycle, it will be noted that the voltage impressed across the primary winding 12 of transformer 11, as represented by curve C, is substantially sinusoidal so that there is impressed on the circuit 14 a satisfactory alternating control voltage. In this manner the circuit comprising the resistances 31, 32 and the capacitance 33 effects an advancement in time of energization of the electric valve means 10 so that the electric valve is rendered conductive during each successive positive half cycle at substantially the beginning of each positive half cycle. In like manner, electric valve means 6 will be rendered conductive at substantially the maximum value of the first positive half cycle of voltage of the alternating current circuit 1 and will be rendered conductive at the beginning of each succeeding positive half cycle. In other words, the phase of the alternating voltage of circuit 14 is advanced after the first positive half cycle of conduction so that the electric valve means 6 is rendered conductive at a predetermined earlier point during succeeding positive half cycles.

A further desirable feature of my invention is the facility with which the circuit may be controlled by the adjustment of the negative unidirectional biasing potential introduced in the excitation circuit 22 by the voltage divider 23. This type of control is particularly useful in those applications where it is desirable to control an electric valve means by the use of a direct current potential having a relatively narrow range of variation. It will be noted, referring to curves B and C of Fig. 2, that if it is desired to effect deenergization of the load circuit 2 at a time corresponding to the point $d$, the voltage fed back to the control member 19 of electric valve means 10 by means of the resistance 31 is less in proportion than that which would be fed back to the control member 19 if the excitation circuit 22 were connected to a voltage divider energized in accordance with the voltage appearing across the primary winding 12 of transformer 11. This feature may be noted by comparing the magnitudes of the voltages as represented by curves B and C at point $e$. In other words, it is possible to effect control of the electric valve means 10 by employing a smaller range of direct current control voltage than would be possible otherwise. I have found that I obtain precise and accurate control of the electric valve means 10 by using a range of negative biasing potential between the values of $-70$ volts and $-90$ volts. That is, the electric valve means 10 may be rendered conductive by decreasing the negative biasing potential to $-70$ volts and the electric valve means 6 may be maintained non-conductive by increasing the negative biasing potential to $-90$ volts. In many of the prior art arrangements for controlling electric valve translating circuits, it is necessary to increase the negative biasing potential to $-140$ volts in order to maintain the electric valve means non-conductive. This gain in ratio of pick-up to drop-out voltage is of particular importance where the available control voltage is limited in range.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, an electric valve means connected therein, and means for rendering said electric valve means conductive at a predetermined time during a predetermined half cycle of voltage of a predetermined sign being responsive to an electrical condition of said electric valve means for advancing the time during successive half cycles of voltage of the same sign at which said electric valve means is rendered conductive.

2. In combination, an alternating current circuit, an electric valve means connected therein, and means for rendering said electric valve means conductive at a predetermined time during a predetermined half cycle of voltage of a predetermined sign and for rendering said electric valve means conductive at the beginning of each successive half cycle of voltage of corresponding sign.

3. In combination, an alternating current circuit, an electric valve means connected therein, and means for rendering said electric valve means conductive at a time corresponding to the maximum value of the first positive half cycle of voltage and for rendering said electric valve means conductive at the beginning of each successive positive half cycle of voltage.

4. In combination, an alternating current supply circuit, an alternating current circuit, a transformer interconnecting said circuits, an electric valve connected in series relation with a primary winding of said transformer and said supply circuit, and means for rendering said electric valve conductive at a predetermined time during a predetermined half cycle of voltage of predetermined sign and for rendering said electric valve conductive at the beginning of each successive half cycle of voltage of corresponding sign.

5. In combination, an alternating current circuit, an electric valve means connected therein and having a control member, means for impressing on said control member a potential to render said electric valve means conductive at a time corresponding to the maximum value of a predetermined positive half cycle of voltage of said alternating current circuit, and means for modifying said potential to render said electric valve means conductive at the beginning of each successive positive half cycle of voltage.

6. In combination, an alternating current circuit, an electric valve means connected therein and having a control member, means for impressing on said control member an alternating voltage adjustable in phase relative to the voltage of said alternating current circuit, means for impressing on said control member a negative unidirectional biasing potential controllable in magnitude for rendering said electric valve means conductive at a time during a predetermined positive half cycle of voltage of said alternating current circuit established by the phase position of said alternating voltage, and means comprising a serially-connected resistance and capacitance connected in series relation with said electric valve means for advancing the time during each successive positive half cycle of alternating voltage at which said electric valve means is rendered conductive.

7. In combination, an alternating current circuit, an electric valve connected therein and including a control member, and an excitation circuit for controlling said electric valve comprising means for impressing on said control member a unidirectional biasing potential, means for impressing on said control member a voltage of peaked wave form displaced in phase relative to the voltage of said alternating current circuit by substantially 90 electrical degrees to render said electric valve conductive at a predetermined time during a predetermined positive half cycle of alternating voltage of said alternating current circuit and means comprising a serially-connected resistance and capacitance connected in series relation with said electric valve for providing a potential opposite in polarity to that of said unidirectional biasing potential for advancing the time during each successive positive half cycle of voltage at which the electric valve is rendered conductive.

8. In combination, an alternating current supply circuit, an alternating current circuit, a transformer interposed between said supply circuit and said circuit, electric valve means connected in series relation with a primary winding of said transformer for controlling the energization of said transformer and having a control member, and an excitation circuit for energizing said control member to control said electric valve means comprising a source of negative unidirectional biasing potential, a source of voltage of peaked wave form having a maximum value substantially equal to the value of said negative biasing potential for rendering said electric valve conductive at a predetermined point during a predetermined positive half cycle of alternating voltage of said supply circuit and a serially-connected resistance and capacitance connected across said primary winding of said transformer for providing a positive potential to advance the time during successive positive half cycles of alternating voltage at which said electric valve means is rendered conductive.

9. In combination, an alternating current circuit, a load circuit, an electric valve means interposed between said alternating current circuit and said load circuit for controlling said load circuit and including a control member, and means responsive to the current transmitted by said electric valve means for impressing on said control member an alternating voltage having a predetermined phase displacement relative to the voltage of said alternating current circuit during a predetermined positive half cycle of voltage and having a different predetermined phase relationship relative to the voltage of said alternating current circuit during successive positive half cycles of voltage.

10. In combination, an alternating current circuit, a load circuit, an electric valve means interposed between said alternating current circuit and said load circuit for controlling said load circuit and including a control member, an alternating current control circuit for energizing said control member, and means for controlling the phase of the voltage of said alternating current control circuit for rendering said electric valve means conductive at a predetermined time during a predetermined positive half cycle of voltage of said alternating current circuit and for rendering said electric valve means conductive at the beginning of each successive positive half cycle of voltage of said alternating current circuit.

11. In combination, an alternating current supply circuit, a load circuit, an electric valve means interposed between said alternating current circuit and said load circuit for controlling said load circuit and including a control member, and means for impressing on said control member an alternating voltage having a predetermined phase displacement relative to the voltage of said alternating current circuit during a predetermined positive half cycle of alternating voltage and having a different phase displacement relative to the voltage of said alternating current circuit during successive positive half cycles of voltage comprising a transformer having a primary winding connected in series relation with a control electric valve means and said alternating current circuit and having a secondary winding connected to energize said control member, said control electric valve means including a control member for controlling the conductivity thereof and an excitation circuit for energizing said control member of said control electric valve means including a source of negative unidirectional biasing potential, a source of alternating voltage and a serially-connected resistance and capacitance connected in series relation with said control electric valve means for providing a positive potential during positive half cycles of voltage of said alternating current circuit to advance the time during each positive half cycle after said predetermined half cycle at which said control electric valve means is rendered conductive.

HAROLD W. LORD.